3,629,300
FUSIDO STEROL AND THE C-3 ACYLATES THEREOF

Wagn Ole Godtfredsen, Vaerlose, Denmark, assignor to Løvens Kemiske Fabrik Produktonsaktieselskab, Ballerup, Denmark
No Drawing. Filed Sept. 2, 1969, Ser. No. 854,795
Claims priority, application Great Britain, Sept. 6, 1968, 42,645/68
Int. Cl. C07c *169/48*
U.S. Cl. 260—397.2         2 Claims

ABSTRACT OF THE DISCLOSURE

The invention relates to a new triterpene, fusidosterol, of hypocholesterolemic effect, to esters thereof with mono- and dibasic lower aliphatic carboxylic acids, and to a method of obtaining the triterpene from the mycelium of fusidinic acid-producing fungi.

---

This invention relates to a hitherto unknown cyclopentenopolyhydrophenanthrene derivative, and to esters thereof.

In particular, the invention relates to a hypocholesterolemic triterpene of the following formula

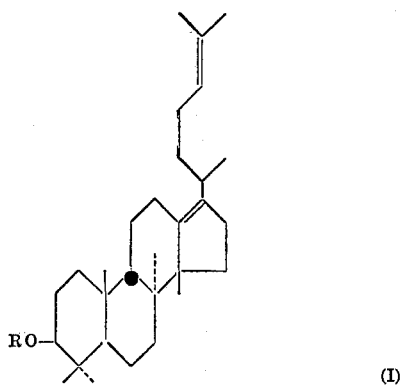

(I)

in which R is hydrogen or a mono- or dibasic lower aliphatic carboxylic acid radical, and to methods of producing the compounds.

It has been found that the novel triterpene of the invention is produced by fusidinic acid producing microorganisms, and may be obtained from the mycelium of the fungus *Fusidium coccineum* e.f. from the mycelium obtained as a by-product in the fermentative production of fusidic acid as described in the British patent specification No. 930,786.

The compound of the invention, in which R is hydrogen, and which in the following is designated fusidosterol, is a white crystalline substance which is soluble in most organic solvents and can advantageously be recrystallized from methanol. The melting point of the pure compound is 115–116° C., $[\alpha]_D^{20}=+18.7°$, and the substance is further characterized by its IR-spectrum and N.M.R.-spectrum, as will appear hereinafter.

In preliminary biological and animal experiments carried out in connection with the present invention, fusidosterol and its esters have proved to be of low toxicity and to exert a powerful hypocholesteremic action since the compounds inhibit the enzyme epoxysqualenecyclase, which converts 2,3-epoxysqualene to lanosterol, the latter being an intermediate in the biosynthesis of cholesterol. The compounds are intended to be used in the treatment of arteriosclerosis, or in a prophylactic treatment where it has been recommended to lower the level of cholesterol in the blood.

It is known that, in addition to the estrogenic effect, some derivatives of estrogens exert a more or less pronounced hypocholesterolemic effect, but where the latter effect is aimed at, the estrogenic effect will normally be undesirable.

As compared with these estrogen derivatives, fusidosterol exerts a specific hypocholesterolemic action without other pharmacological effects being noted.

In a preferred method, fusidosterol is prepared by extracting the mycelium from a fermentation of *Fusidium coccineum* with a suitable lipoid solvent, for instance petroleum ether, benzene, chloroform, or acetone, possibly after drying the mycelium, and at room temperature or elevated temperature, whereafter fusidosterol is isolated fom the extract using isolation techniques which are known per se. Thus, the lipoids and other saponifiable matters of the extract can be removed by saponification, e.g. with alkaline aqueous alcohols, whereafter fusidosterol may be isolated from the unsaponifiable matter by chromatography, using as solvents mixtures of light petroleum with increasing amounts of, for instance, ether, ethyl acetate, acetone, and alcohols, and using the well-known adsorbent media, such as alumina, silica gel etcetera, the fusidosterol further being purified by crystallization.

The esters of Formula I, R being different from hydrogen, can be prepared according to well-known esterification processes, such as acetylation with a mono- or dibasic lower aliphatic carboxylic acid or with a reactive derivative thereof, e.g. an acid halide, an acid anhydride, or a mixed anhydride, preferably in the presence of pyridine or the like and an inert organic solvent.

The invention will now be illustrated by the following non-limiting example.

EXAMPLE

Isolation of fusidosterol 5.4 kg. of moist mycelium from a fermentation of *Fusidium coccineum* K. Tubaki carried out as described in Example 6 in the specification of U.S. Pat. No. 3,072,531 was washed with water and dried in vacuo at 50° C. The dried product (1080 g.) was milled and extracted with light petroleum (B.P. 60–80° C.) in a Soxhlet extractor. The extract was evaporated to leave 145 g. of a yellow oily residue. This was refluxed for 2 hours in a mixture of ethanol (300 ml.) and 14 N KOH (75 ml.). After concentration in vacuo, water (1,000 ml.) was added, and the unsaponifiable matter was extracted with ether. The extract was washed with water, dried, and evaporated to leave a residue 11.3 g.). This was chromatographed on alumina (500 g.). The column was eluted with light petroleum-ether (95.5), and the fractions, which according to thin layer chromatography contained the desired compound, were combined and evaporated to leave a semicrystallinic solid which was recrystallized from methanol to yield pure fusidosterol, M.P. 115–116° C.; $[\alpha]_D+18.7°$ (CHCl$_3$). The IR-spectrum (KBr) contains bands at 3420, 2980, 2920, 1490, 1460, 1380, 1335, 1295, 1255, 1170, 1145, 1100, 1085, 1030, 1015, 1000, and 970 cm.$^{-1}$. The mass-spectrum showed peaks at m./e.=426 (M+), 411, 393, 357, 342, 339, 315, 313, 300, 297, 229, 218, 203, 189, 175, 161, 149, 147, 135. The compound was further characterized by its 3-acetate, which was obtained by acetylation with acetic anhydride in the presence of pyridine. M.P. 98–100° C.; $[\alpha]+26$(CHCl$_3$).

N.M.R.-spectrum (CDCl$_3$): Signals at $\delta=0.85$/s., 0.92/s., 0.97/s., 1.04/s., 1.54, 1.65, 201/s., 4.47/m., and 5.06/m. Mass-spectrum: Peaks at m./e.=468 (M+), 399, 384, 357, 355, 342, 339, 326, 297, 248, 218, 203, 189, 175, 161, 149, 147.

The 3-butyrate and the 3-hemisuccinate of fusidosterol are prepared similarly to the acetate.

What I claim is:

1. A triterpene compound of the Formula I

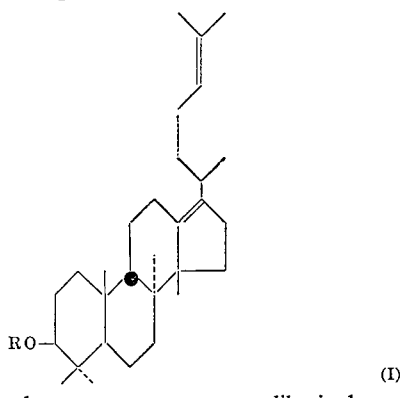

(I)

in which R is hydrogen or a mono- or dibasic lower aliphatic carboxylic acid radical.

2. A method for the preparation of the compounds of claim 1, characterized in that the lipoids of the mycelium from a fermentation of *Fusidium coccineum* are extracted, isolated and saponified, whereafter the unsaponifiable matter is purified to yield the compound of Formula I (R being hydrogen), whereafter in the case when R is different from hydrogen the compounds of Formula I are obtained by an esterification with a carboxylic acid or a reactive derivative thereof.

References Cited
UNITED STATES PATENTS 3,499,012  3/1970  Godtfredsen et al. __ 260—397.1

ELBERT L. ROBERTS, Primary Examiner

U.S. Cl. X.R.

195—51; 260—397.25